May 21, 1946. C. PRATHER ET AL 2,400,712
DRILL PIPE SPINNER
Filed July 3, 1943 2 Sheets-Sheet 2
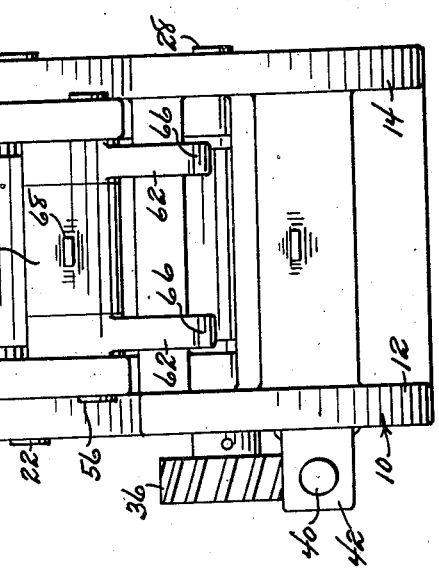
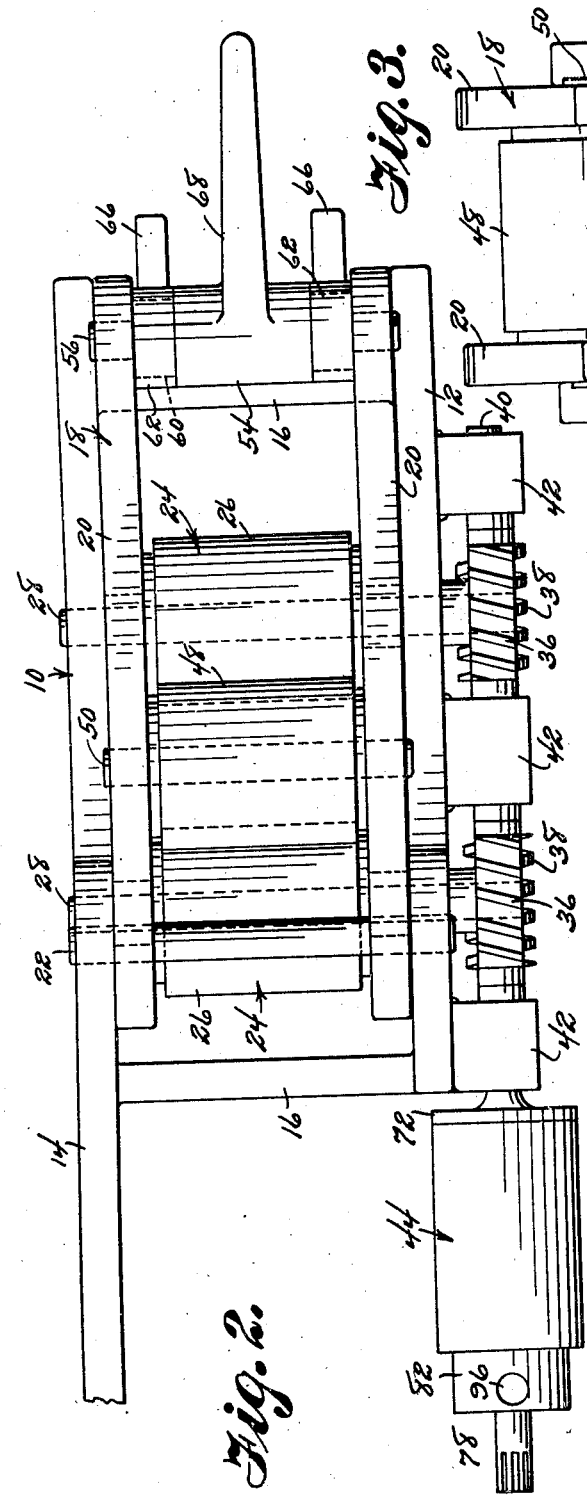
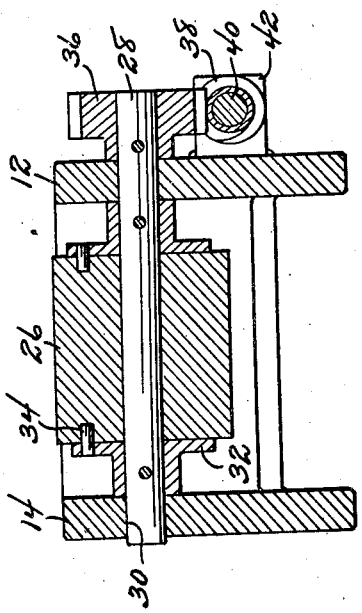
Charles Prather
Fred A. Rydberg
INVENTORS
BY
Victor J. Evans & Co.
ATTORNEYS Patented May 21, 1946

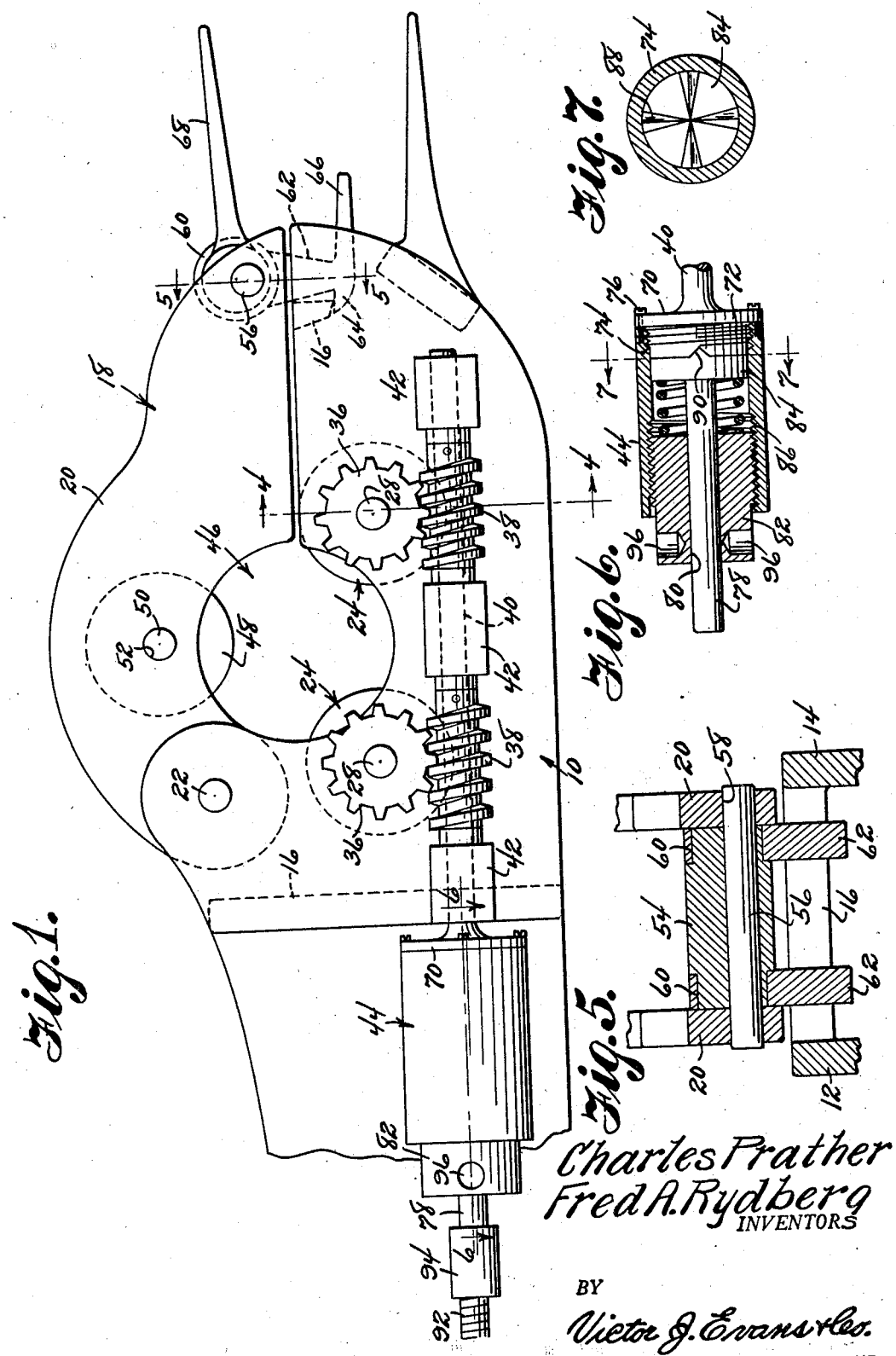

2,400,712

UNITED STATES PATENT OFFICE 2,400,712

DRILL PIPE SPINNER

Charles Prather and Fred A. Rydberg, Bairoil, Wyo.

Application July 3, 1943, Serial No. 493,473

2 Claims. (Cl. 81—57)

Our invention relates to rotary drill pipe spinning operations, and has among its objects and advantages the provision of an improved drill pipe spinner.

In the accompanying drawings:

Figure 1 is a face view of the spinner.

Figure 2 is a view of the spinner rotated 90 degrees.

Figure 3 is an end view.

Figure 4 is a sectional view along the line 4—4 of Figure 1.

Figure 5 is a sectional view along the line 5—5 of Figure 1.

Figure 6 is a sectional view along the line 6—6 of Figure 1, and

Figure 7 is a sectional view along the line 7—7 of Figure 6.

In the embodiment of the invention selected for illustration, we make use of a frame 10 provided with two side walls 12 and 14 fixedly connected together by cross members 16. A hinged frame 18 is associated with the frame 10. The frame 18 comprises two plates 20 pivotally mounted upon a shaft 22 carried by the walls 12 and 14.

Two pipe engaging drive rollers 24 are carried by the walls 12 and 14. The two drive rollers are of the same construction. Figure 4 illustrates one of the drive rollers, wherein the pipe engaging body 26 is mounted on a shaft 28 rotatably supported in openings 30 in the walls 12 and 14. Flanges 32 are fixed to the shaft 28 and are keyed at 34 to the body 26. To one end of the shaft 28 is attached a worm gear 36 which is driven by a worm 38. The two worms 38 are attached to a shaft 40 rotatably supported in bearings 42 mounted on the wall 12. This shaft connects with a slip clutch or torque control 44.

The walls 12 and 14 and the plates 20 are shaped to provide a pipe receiving opening 46, and the rollers 24 are arranged with portions of their circumferential faces extending into the opening 46 to engage the drill pipe.

An idle roller 48 is mounted on a shaft 50 rotatably supported in openings 52 in the plates 20. The idle roller 48 is so arranged with respect to the driven rollers 24 as to clamp the drill pipe against the driven rollers when the frame 18 is clamped to the frame 10. The rollers 24 and the roller 48 are spaced substantially equal distances about the drill pipe.

Means for clamping the frame 18 to the frame 10 comprises a body 54 attached to a shaft 56 rotatably supported in openings 58 in the walls 20. Coaxial end shafts 60 are formed on the body 54 adjacent the walls 20, which end shafts are eccentrically related to the axis of the shaft 56.

Two arms 62 are rotatably mounted on the end shafts 60 and are provided with hooks 64 engageable underneath one of the cross bars 16 attached to the walls 12 and 14. Fingers 66 are attached to the hooks 64 to facilitate manipulation thereof. To the body 54 is fixedly connected a handle 68 through the medium of which the body 54 may be rotated to apply clamping engagement between the hook 64 and their coacting cross member 16.

In Figure 6, the shaft 40 is provided with a flange 70 having a plug 72 threaded into one end of a tubular body 74. Bolts 76 extend through the flange 70 and are threaded into the body 74 to prevent unloosening of the plug 72.

A drive shaft 78 is rotatably mounted in a bore 80 in a body 82 threaded into the other end of the tubular body 74. A flange 84 is fixed to the inner end of the shaft 78 and normally lies in face to face engagement with the end face of the plug 72. Such engagement is resiliently maintained by a compression spring 86 interposed between the body 82 and the flange 84. The flange 84 fits loosely in the tubular body 74, and a driving connection between the flange 84 and the shaft 40 is attained by a plurality of V-shaped dogs 88 on the flange 84 and receivable in correspondingly shaped grooves 90 in the plug 72. The ribs and the grooves are arranged radially with respect to the axes of the shafts 40 and 78, the two shafts being coaxial. Figure 1 illustrates a flexible drive shaft 92 as having a splined connection 94 with the shaft 78, the shaft 92 being connected with a suitable source of power, not shown.

Under normal operating conditions, the spring 86 is of sufficient tension to hold the ribs 88 in driving engagement with the wall faces of the grooves 90. When the load becomes objectionably excessive, the spring 86 yields to permit retraction of the ribs 88 from the grooves 90 so that the shaft 78 may continue rotation relatively to the shaft 40.

The tension of the spring 86 may be varied through adjustment of the body 82, the latter being provided with openings 96 for the insertion of suitable tools.

The two drive rollers 24 may be provided with knurled faces or made up of compounded friction material to increase their frictional grip on the drill pipe.

Our invention provides a spinner which is speedy in operation and embodying safety features. The spinner eliminates accidents due to workmen becoming caught in spinning lines employed in connection with catheads. The spinner is of durable construction and eliminates frequent replacements of catheads on drilling rigs. The device conserves space on the derrick floor, which is otherwise taken up by ropes employed to spin up the drill pipe. One man can spin the drill pipe up with perfect safety, whereas in conventional systems employing ropes, the operation is a dangerous one and requires at least two men. The spinner will save at least five thousand feet of rope a year.

Without further elaboration, the foregoing will so fully explain our invention, that others may, by applying current knowledge, readily adapt the same for use under various conditions of service.

We claim:

1. A drill pipe spinner, comprising a first support, a second support pivoted to the first support, two spaced driven rollers mounted on the first support for driving engagement with a drill pipe, an idle roller mounted on the second support for contact with the drill pipe, the driven and idle rollers being arranged in substantially equal distances about the drill pipe, a pivoted latch carried by the pivoted support and engaging the first support for locking the same together, a handle operating the latch and forming means by which the pivoted support may be moved to open or closed position, and a drive shaft carried by the first support and having a worm drive connection with the shafts of the driven rollers for driving the rollers in same direction.

2. A drill pipe spinner, comprising a first support, a second support pivoted to the first support, two spaced driven rollers mounted on the first support for driving engagement with a drill pipe, an idle roller mounted on the second support for contact with the drill pipe, the driven and idle rollers being arranged in substantially equal distances about the drill pipe, a pivoted latch carried by the pivoted support and engaging the first support for locking the same together, a handle operating the latch and forming means by which the pivoted support may be moved to an open or closed position, a drive shaft carried by the first support and having two spaced worms intermediately supported by a bearing, and worm gears carried by the shafts of the driven rollers and meshing with the worms for driving the rollers in the same direction.

CHARLES PRATHER.
FRED A. RYDBERG.